US009220108B2

(12) United States Patent
To et al.

(10) Patent No.: US 9,220,108 B2
(45) Date of Patent: Dec. 22, 2015

(54) SCHEDULING METHOD AND CONTROL STATION APPARATUS

(71) Applicant: SHARP KABUSHIKI KAISHA, Osaka-shi, Osaka (JP)

(72) Inventors: Shimpei To, Osaka (JP); Yasuhiro Hamaguchi, Osaka (JP); Hideo Namba, Osaka (JP); Minoru Kubota, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 46 days.

(21) Appl. No.: 14/304,301

(22) Filed: Jun. 13, 2014

(65) Prior Publication Data
US 2014/0293926 A1    Oct. 2, 2014

Related U.S. Application Data

(62) Division of application No. 12/668,403, filed as application No. PCT/JP2008/062263 on Jul. 7, 2008, now Pat. No. 8,843,149.

(30) Foreign Application Priority Data

Jul. 9, 2007   (JP) ................................. 2007-180134

(51) Int. Cl.
*H04L 1/00*     (2006.01)
*H04W 4/00*    (2009.01)
(Continued)

(52) U.S. Cl.
CPC ............. *H04W 72/048* (2013.01); *H04L 5/003* (2013.01); *H04L 5/0007* (2013.01);
(Continued)

(58) Field of Classification Search
CPC ............ H04W 72/04; H04W 72/1263; H04W 52/146; H04L 5/0042; H04L 25/0204; H04L 27/2636; H04L 5/0023
USPC ............... 455/509, 452.1, 450; 370/329, 330, 370/322, 437, 341
See application file for complete search history.

(56) References Cited

U.S. PATENT DOCUMENTS 5,398,247 A * 3/1995 Delprat ................. H04J 3/1647
                                                          370/347
7,675,986 B1    3/2010 Nergis
(Continued)

FOREIGN PATENT DOCUMENTS

JP         2006-217415 A    8/2006
WO    WO 2006/038694 A1   4/2006
(Continued)

OTHER PUBLICATIONS

3GPP, TR 25.814 v. 7.1.0 (Sep. 2006) Technical Report, "Physical Layer Aspects for Evolved UTRA," 3rd Generation Partnership Project; Technical Specification Group Radio Access Network; (Release 7), pp. 1-132.
(Continued)

*Primary Examiner* — Inder Mehra
(74) *Attorney, Agent, or Firm* — Birch, Stewart, Kolasch & Birch, LLP

(57) ABSTRACT

A communication terminal performing Fourier transform to convert a first time-domain signal into frequency-domain signals, allocating the frequency-domain signals to one or more first block is composed of two or more contiguous subcarriers as a first allocation unit, performing inverse Fourier transform to convert the allocated frequency-domain signals into a second time-domain signal, and transmitting, to a BS, the second time-domain signal simultaneously with another communication terminal, in case that the other communication apparatus performs communication with the BS using one or more second block composed of two or more contiguous subcarriers as a second allocation unit wherein the second block, wherein the number of subcarriers of the second block is equal to a value of x multiplied by the number of subcarriers of the first block, and x is equal to a value of 2 or a value greater than 2.

6 Claims, 13 Drawing Sheets

(51) Int. Cl.
  *H04W 72/00*   (2009.01)
  *H04B 7/00*    (2006.01)
  *H04W 72/04*   (2009.01)
  *H04L 5/00*    (2006.01)
  *H04L 27/26*   (2006.01)

(52) U.S. Cl.
  CPC .......... *H04L 5/0039* (2013.01); *H04L 5/0042* (2013.01); *H04L 5/0064* (2013.01); *H04L 5/0075* (2013.01); *H04L 27/2601* (2013.01); *H04L 27/2602* (2013.01); *H04L 27/2614* (2013.01); *H04L 27/2636* (2013.01); *H04L 5/0044* (2013.01); *H04L 5/0069* (2013.01); *H04L 5/0085* (2013.01)

(56) References Cited

U.S. PATENT DOCUMENTS

| | | |
|---|---|---|
| 7,733,977 B2 | 6/2010 | Kuri et al. |
| 2005/0111429 A1 | 5/2005 | Kim et al. |
| 2006/0063543 A1 | 3/2006 | Matoba et al. |
| 2007/0223440 A1 | 9/2007 | Ho et al. |
| 2007/0291702 A1 | 12/2007 | Nanba et al. |
| 2007/0297386 A1 | 12/2007 | Zhang et al. |
| 2008/0056183 A1 | 3/2008 | Gorokhov et al. |
| 2008/0062953 A1 | 3/2008 | Li et al. |
| 2008/0076407 A1 | 3/2008 | Shitara |
| 2008/0146215 A1 | 6/2008 | Oota |
| 2009/0238123 A1 | 9/2009 | Kuri et al. |
| 2010/0142612 A1 | 6/2010 | van Rooyen |
| 2012/0147846 A1 | 6/2012 | Ho et al. |

FOREIGN PATENT DOCUMENTS

| | | |
|---|---|---|
| WO | WO 2006/043588 A1 | 4/2006 |
| WO | WO 2007/016312 A2 | 2/2007 |
| WO | WO 2007/055292 A1 | 5/2007 |
| WO | WO 2007/072828 A1 | 6/2007 |

OTHER PUBLICATIONS

3GPP, TR 25.876 V7.0.0 (Mar. 2007) Technical Report, "Multiple Input Multiple Output in UTRA," 3rd Generation Partnership Project; Technical Specification Group Radio Access Network; (Relase 7), pp. 1-76.

International Search Report issued in International Application No. PCT/JP2008/062263 on Oct. 7, 2008.

Mashima et al., "A Study on Broadband Single Carrier Transmission Technique Using Dynamic Spectrum Control," The Institute of Electronics, Information and Communication Engineers, Technical Report of IEICE, RCS2006-233, pp. 1-6.

U.S. Advisory Action issued in U.S. Appl. No. 12/668,403 on Jul. 8, 2013.

U.S. Notice of Allowance issued in U.S. Appl. No. 12/668,403 on Mar. 14, 2014.

U.S. Office Action issued in U.S. Appl. No. 12/668,403 on Aug. 20, 2012.

U.S. Office Action issued in U.S. Appl. No. 12/668,403 on Mar. 14, 2013.

U.S. Office Action issued in U.S. Appl. No. 12/668,403 on Oct. 3, 2013.

G. Song, et al., "Adaptive Subcarrier and Power Allocation in OFDM Based on Maximizing Utility", VTC 2003-Spring, The 57th IEEE Semiannual Vehicular Technology Conference, Proceedings. Jeju, Korea, Apr. 22, 2003, pp. 905-909, XP010862546, IEEE Vehicular Technology Conference, New York, NY, IEEE, vol. 2.

X. Zhang, et al., "QoS-Driven Asynchronous Uplink Subchannel Allocation Algorithms for Space-time OFDM-CDMA Systems in Wireless Networks", Wireless Networks; The Journal of Mobile Communication, Kluwer Academic Publishers, DO, vol. 12, No. 4, May 8, 2006, pp. 411-425, XP019410568.

Z. Cao, et al., "Utility Max-Min: An Application-Oriented Bandwidth Allocation Scheme", Infocom '99, Eighteenth Annual Joint Conference of the IEEE Computer and Communications Societies. Proceedings, IEEE New York, NY, Piscataway, NJ, US, vol. 2, Mar. 21, 1999, pp. 793-801, XP010323788.

* cited by examiner

SCHEDULING METHOD AND CONTROL STATION APPARATUS

This application is a Divisional of co-pending application Ser. No. 12/668,403 filed on Feb. 3, 2010, and for which priority is claimed under 35 U.S.C. §120, application Ser. No. 12/668,403 is the national phase of PCT International Application No. PCT/JP2008/062263 filed on Jul. 7, 2008 under 35 U.S.C. §371, which claims the benefit of priority of JP2007-180134 filed Jul. 9, 2007. The entire contents of each of the above-identified applications are hereby incorporated by reference.

TECHNICAL FIELD

The present invention relates to a scheduling method and a control station apparatus employed for a radio communication system that uses cellular radio system.

BACKGROUND ART

With the recent increase in the amount of data communication, there is a growing need for mobile communication systems having a higher efficiency of frequency usage, and various studies relating to one-cell reuse cellular systems in which all the cells employ the same frequency band are being conducted. In the E-UTRA (Evolved Universal Terrestrial Radio Access) system, which is one of the one-cell reuse cellular systems and under standardization by the 3GPP (3rd Generation Partnership Project), OFDMA (Orthogonal Frequency Division Multiple Access) system is being considered as the most promising candidate of down-link transmission system and SC-FDMA (Single Carrier Frequency Division Multiple Access) system as the most promising candidate of uplink transmission system (see, for example, non-patent document 1).

Although OFDMA is a system by which a terminal accesses in resource block units that are divided by time and frequency using OFDM signals having good tolerance against multi-path fading, it is not suitable for uplink transmission system that severely restricts transmission power due to its high PAPR (Peak-to-Average Power Ratio). On the contrary, SC-FDMA system is suitable for uplink transmission, because it can suppress PAPR to be low in comparison with multi-carrier system such as OFDM so that a wide coverage can be assured.

FIG. 11 shows a configuration of a transmission device (terminal-side transmission device) using SC-FDMA system. In a transmission device using SC-FDMA system, as shown in FIG. 11, the transmission data is first subjected to error correction coding in a coding unit 1000, and modulated in a modulation unit 1001. Next, after being serial-to-parallel converted in an S/P conversion unit 1002, the modulated transmission signal is converted to a frequency domain signal in a DFT (Discrete Fourier Transform) unit 1003.

The transmission signal thus converted to a frequency domain signal as described above is mapped by a subcarrier mapping unit 1004 to a spectrum (subcarrier) to be used for transmission. Here, zero is inserted into a spectrum (subcarrier) that is not used for transmission. Next, the transmission signal mapped by the subcarrier mapping unit 1004 to a spectrum to be used for transmission is input to an IFFT (Inverse Fast Fourier Transform) unit 1005, and converted from a frequency domain signal to a time domain signal. Then, the signal goes through a P/S conversion unit 1006, has a GI inserted therein at a GI (Guard Interval) insertion unit 1007 and, after having been converted to an analog signal by a D/A conversion unit 1008, is up-converted to a radio frequency band signal by a radio unit 1009, and transmitted from an antenna unit 1010.

The transmission signal generated as described above has a lower PAPR than a multi-carrier signal, and has an advantage in that spectrum control can be easily performed because the signal is temporarily converted to a frequency domain signal using DFT. In 3GPP, two types of technique shown in FIG. 12 are proposed as spectrum control methods preserving low PAPR characteristic. The localized allocation shown in FIG. 12A is a technique that preserves a continuous spectrum allocation of transmission signals converted to frequency domain signals by the DFT unit 1003, and the distributed allocation shown in FIG. 12B is a technique that reallocates continuous spectra of transmission signals converted to frequency domain signals by the DFT unit 1003 at a constant interval. When the localized allocation is used, multi-user diversity effect can be obtained by selecting continuous spectra in which signals from respective terminals are received with a high reception power. When the distributed allocation is used, on the other hand, frequency diversity effect can be obtained because spectra are allocated across a wider frequency band than when the localized allocation is used.

In addition, SC-ASA (Single Carrier-Adaptive Spectrum Allocation) system is proposed as a method of realizing a more flexible spectrum control than the two techniques shown in FIG. 12 (for example, non-patent document 2). SC-ASA is a method of freely allocating the spectrum to be used for transmission according to the signal reception condition from each user. The reception characteristic can be largely improved by selecting a spectrum that can obtain high received signal power, although with a slightly higher PAPR than when performing localized allocation or distributed allocation.

With SC-ASA system, PAPR can also be suppressed low by dividing the subcarrier used for transmission into several blocks and continuously mapping subcarriers in a block. It is particularly necessary to reduce PAPR when the possibility that signal distortion may occur rises due to non-linear amplifiers, such as when a terminal is located distant from the base station and high transmission power is required, or when performing transmission in a low power consumption mode with lowered bias voltage to non-linear amplifiers. Therefore, it is important to perform spectrum control (allocation) provided that the subcarriers are grouped into blocks) in varied sizes according to the situation of each terminal. In such a case, terminals with subcarriers grouped into block(s) in varied sizes coexist as simultaneously accessing terminals (which will be referred to as "simultaneous access terminals" as appropriate, hereinafter).

In a cellular system, a plurality of terminals accesses the base station using the transmission system described above to perform data transmission and, according to the non-patent documents 1 and 2, access is performed on a subchannel basis, where subchannels are formed by dividing all the available frequency bands into several segments. Therefore, even a method of flexibly allocating a spectrum to be used, such as SC-ASA system, does not assume to allocate the spectrum beyond the range of a single subchannel, and an adaptive spectrum allocation is performed only within a subchannel.

In a system where a terminal accesses on a subchannel basis as described above, the number of simultaneously accessible terminals is limited to the number of subchannels, and thus it is necessary, before performing spectrum control of each terminal, to select terminals that simultaneously access and allocate a subchannel to each of the selected terminals. Here, round-robin, Max CIR (Carrier-to-Interference power Ratio), or PF (Proportional Fairness) are included in the method of selecting (scheduling) simultaneous access terminals (see, for example, non-patent document 3).

Round-robin is a method of putting all the terminals that have data in a queue and sequentially selecting as many terminals as (at most) the number of subchannels from the queue. A terminal selected from the queue and having finished a certain data transmission is put into the tail of the queue again. Although round-robin can provide equal transmission opportunity to all the terminals, there exists a shortcoming in that cell throughput is limited to be low because channel condition of each terminal is not considered at all. On the other hand, Max CIR selects, as many terminals having the best channel condition as the number of subchannels (at most). When Max CIR is employed, although cell throughput can be maximized, it is very likely that terminals located near the base station have more transmission opportunities, resulting in lack of fairness among terminals.

PF is a method of constantly updating average reception power of each terminal, calculating the difference between the instantaneous reception power and the average reception power, and selecting as many terminals having a large difference as the number of subchannels (at most). Since, according to PF, transmission opportunity is provided to a terminal having the most improved channel condition, cell throughput can be improved compared with the case using round-robin, although PF is not as good as Max CIR. In addition, because the selection is not based on the absolute value of reception power but on the difference between the instantaneous reception power and the average reception power, other terminals as well as those located near the base station are selected, and thereby fairness among terminals can be preserved.

[Non-patent document 1] 3GPP, TR 25.814 v7.1.0, "Physical Layer Aspects for Evolved UTRA"
[Non-patent document 2] IEICE Technical Report RCS2006-233
[Non-patent document 3] 3GPP, TR 25.876 v7.0.0, "Multiple Input Multiple Output in UTRA"

DISCLOSURE OF THE INVENTION

In a system of performing flexible spectrum allocation such as SC-ASA system, it is important to allocate subcarriers freely within an available frequency band instead of accessing on a subchannel basis, as described in the non-patent document 2, in order to further increase the degree of freedom of allocation. By allocating subcarriers freely within a band, a higher cell throughput is expected because the probability of selecting a subcarrier having a better channel condition increases, compared with the case having a constraint such as subchannels.

However, when performing subcarrier allocation with a very high degree of freedom as described above in a situation where many terminals are coexisting with subcarriers grouped into block(s) in varied sizes by SC-ASA system, selecting simultaneous access terminals by round-robin, Max CIR, or PF may cause a situation where some terminals cannot have a subcarrier allocated thereto. This is because, although there must be as many consecutive unallocated subcarriers as the number of subcarriers included in a block when allocating subcarriers to a terminal which has to perform transmission with subcarriers grouped into block(s) due to various reasons such as position or power consumption mode of the terminal, there may arise a situation where it is impossible to reserve as many consecutive unallocated subcarriers as the block size, as allocation of subcarriers to each terminal proceeds, depending on the size of the block used by each terminal selected as a simultaneous access terminal and the position of the subcarrier selected by each terminal.

FIG. 13 shows an exemplary situation where a subcarrier cannot be allocated, as described above. In FIG. 13, the values shown in table 1 are used as the numbers of subcarrier blocks used by terminals and the numbers of subcarriers included in the blocks to exemplify the result of spectrum allocation when the terminals of table 1 are distributed within a cell. Additionally, in FIG. 13, the total number of available subcarriers is 384, the maximum and minimum numbers of subcarriers available for each terminal are 64 and 16 respectively, and the number of subcarriers included in a block (block size) is 64, 32, 16, 8, 4 or 1 (which is equivalent to when not divided into blocks), as shown in table 1. In addition, there are six terminals (a to f) each having the same number of subcarriers grouped into a block. Here, the number shown in parentheses in table 1 and FIG. 13 indicates the block size of each terminal, with the subcarriers to which each terminal is assigned being expressed by rectangular sections in FIG. 13.

TABLE 1

| Terminal ID | Block size (L) | Number of blocks(M) | Number of subcarriers used (N) |
| --- | --- | --- | --- |
| MT(64)a~MT(64)f | 64 | 1 | 64 |
| MT(32)a~MT(32)c | 32 | 1 | 32 |
| MT(32)d~MT(32)f | 32 | 2 | 64 |
| MT(16)a~MT(16)b | 16 | 1 | 16 |
| MT(16)c~MT(16)d | 16 | 2 | 32 |
| MT(16)e~MT(16)f | 16 | 4 | 64 |
| MT(8)a~MT(8)b | 8 | 2 | 16 |
| MT(8)c~MT(8)d | 8 | 4 | 32 |
| MT(8)e~MT(8)f | 8 | 8 | 64 |
| MT(4)a~MT(4)b | 4 | 4 | 16 |
| MT(4)c~MT(4)d | 4 | 8 | 32 |
| MT(4)e~MT(4)f | 4 | 16 | 64 |
| MT(1)a~MT(1)b | 1 | 16 | 16 |
| MT(1)c~MT(1)d | 1 | 32 | 32 |
| MT(1)e~MT(1)f | 1 | 64 | 64 |

※ $N = L \times M$

Although the three systems (round-robin, Max CIR, and PF) described above select simultaneous access terminals according to different standards respectively, it is assumed here that the result of selecting terminals by them is the same, and that six terminals (MT(64)b, MT(64)c, MT(64)d, MT(32)a, MT(32)e, and MT(32)c, with the number of subcarriers required for these terminals is 320 in all) shown in the upper part of FIG. 13 have been selected. When the six terminals are selected as simultaneous access terminals and subcarriers are selected in the order of superiority of the channel condition, starting from the leftmost terminal (that requires the largest number of subcarriers), allocation of subcarriers may be performed as shown in FIG. 13. FIG. 13 shows a situation where MT(32)c cannot be assigned due to failure of reserving 32 consecutive subcarriers although there remain as many as 96 available subcarriers.

In such a case, it is necessary to repeat allocation of subcarriers or selection of simultaneous access terminals and allocation of subcarriers so that allocation of subcarriers for all the simultaneous access terminals is completed, or to postpone data transmission of a terminal (MT(32)c, here) for which allocation of consecutive subcarriers is determined to be impossible. When performing such processing, the former is very inefficient in terms of scheduling, and efficiency of frequency usage decreases because it may be necessary to select a subcarrier without considering the channels condition in order to allocate subcarriers to all the terminals that have been selected as simultaneous access terminals. The latter results in significantly degraded frequency usage efficiency particularly in a situation where there is little interference from adjacent cells, because, though there are unused subcarriers, they are not used for data transmission.

The present invention has been made in view of such a problem, and it is therefore an object of the present invention to provide a scheduling method and a control station apparatus that can properly allocate consecutive subcarriers to terminals.

(1) The present invention has prepared the following means in order to achieve the above object. The scheduling method according to the present invention is the one for allocating, within an available band, a block composed of one or more subcarriers and used for signal transmission by a communication terminal being a destination of communication, the method comprising the steps of: selecting, with a higher priority, communication terminals having different number of subcarriers composing the block as simultaneously communicating terminals that perform signal transmission simultaneously; and allocating the blocks for use by the simultaneously communicating terminals within the available band.

As described above, it is possible to avoid a situation where a block cannot be allocated for use by a communication terminal due to failure of reserving consecutive subcarriers, because communication terminals having different number of subcarriers composing the blocks are selected with a higher priority as simultaneously communicating terminals, and the blocks for use by the simultaneously communicating terminals are allocated within the available band.

(2) In addition, the scheduling method of the present invention further comprises the steps of: grouping the communication terminals having subcarriers composing the block so that the number of subcarriers falls within a predefined range; and selecting the simultaneously communicating terminals from at least two groups.

As described above, it becomes possible to reliably select at least two simultaneously communicating terminals having different number of subcarriers composing a block, because communication terminals having subcarriers composing the block are grouped, the number of subcarriers being within a predefined range, and the simultaneously communicating terminals are selected from at least two groups. Particularly, it becomes possible to select simultaneously communicating terminals flexibly adapting to a case where there are many blocks having different number of subcarriers, because communication terminals having subcarriers composing the block are grouped, the number of subcarriers being within a predefined range.

(3) In addition, the scheduling method of the present invention further comprises the steps of: grouping the communication terminals having the same number of subcarriers composing the block; and selecting at least one of the simultaneously communicating terminals from each group.

As described above, it becomes possible to reliably select, at least one by one, simultaneously communicating terminals having different number of subcarriers composing a block, because the communication terminals having the same number of subcarriers composing the block are grouped, and at least one simultaneous communication terminal is selected from each group.

(4) In addition, in the scheduling method of the present invention, the blocks for use respectively by the communication terminals selected as the simultaneously communicating terminals are allocated to frequencies having good channel condition for respective communication terminals.

As described above, it becomes possible to flexibly allocate subcarriers according to the channel condition, because the blocks respectively for use by communication terminals selected as the simultaneously communicating terminals are assigned to frequencies having good channel condition for respective communication terminals.

(5) In addition, in the scheduling method of the present invention, the blocks for use respectively by the communication terminals selected as the simultaneously communicating terminals are allocated in descending order of the block size.

As described above, a smaller-sized block is allocated with a lower priority, because the blocks respectively for use by communication terminals selected as the simultaneously communicating terminals are assigned in descending order of the block size. Because a smaller-sized block has more flexibility in spectrum allocation than a larger-sized block, it is possible to avoid a situation where a communication terminal (block) cannot be allocated although there remain unallocated subcarriers.

(6) Additionally, in the scheduling method of the present invention, the number of subcarriers composing the block is determined based on at least one of: distance between a control station apparatus communicating with the communication terminal and the communication terminal; transmission power of the communication terminal; and power consumption mode of the communication terminal.

As described above, the number of subcarriers composing a block can be determined according to the current situation in the communication terminal, because the number of subcarriers composing the block is determined based on at least one of: distance between a control station apparatus and the communication terminal, transmission power of the communication terminal, and power consumption mode of the communication terminal. Therefore it becomes possible to avoid a situation where a signal is non-linearly amplified by an amplifier.

(7) In addition, in the scheduling method of the present invention, the number of subcarriers composing the block is increased when the distance between the control station apparatus and the communication terminal is larger than a certain distance, when the transmission power is larger than a certain value, or when the power consumption mode of the communication terminal is a low power consumption mode.

As described above, it becomes possible to avoid a situation where PAPR characteristic of transmission signals degrades and signals are non-linearly amplified, because the number of subcarriers composing the block is increased when the distance between the control station apparatus and the communication terminal is larger than a certain distance, when the transmission power is larger than a certain value, or when the power consumption mode of the communication terminal is low power consumption mode.

(8) Additionally, in the scheduling method of the present invention, the communication terminal is a communication terminal that performs single carrier transmission using adaptive spectrum allocation.

As described above, spectra to be used for transmission can be freely allocated according to the signal reception status, because the communication terminal performs single carrier transmission using adaptive spectrum allocation. Accordingly, it becomes possible to improve reception characteristic in a communication terminal while exhibiting the effect that consecutive subcarriers can be properly allocated to a terminal.

(9) Additionally, in the scheduling method of the present invention, the communication terminals having a single subcarrier composing the block include communication terminals that perform OFDM transmission.

As described above, it becomes possible to perform flexible scheduling that selects, as simultaneously communicating terminals, communication terminals that perform OFDM transmission and communication terminals that perform transmission using other transmission methods (for example, single carrier transmission using adaptive spectrum allocation), because the communication terminals having a single subcarrier composing the block include communication terminals that perform OFDM transmission.

(10) Additionally, the control station apparatus according to the present invention is the one that performs transmission by allocating, within an available band, a block composed of one or more subcarriers and used for signal transmission by a communication terminal being a destination of communication, the apparatus comprising a scheduling unit that selects, with a higher priority, communication terminals having different number of subcarriers composing the blocks as simultaneously communicating terminals that perform signal transmission simultaneously and allocates the blocks for use by the simultaneously communicating terminals within the available band.

As described above, it is possible to avoid a situation where a block cannot be allocated for use by a communication terminal due to failure of reserving consecutive subcarriers, because communication terminals having different number of subcarriers composing the block are selected with a higher priority as simultaneously communicating terminals, and a block for use by the simultaneously communicating terminals is allocated within an available band. Accordingly, it becomes possible to flexibly allocate subcarriers.

(11) In addition, the control station apparatus of the present invention transmits, to the communication terminal, control information instructing to perform single carrier transmission using adaptive spectrum allocation.

As described above, spectrum to be used for transmission can be freely allocated in the communication terminal according to the signal reception status, because control information instructing to perform single carrier transmission using adaptive spectrum allocation is transmitted to the communication terminal. Accordingly, it becomes possible to improve the reception characteristic in the communication terminal while exhibiting the effect that subcarrier can be flexibly allocated.

(12) In addition, the control station apparatus of the present invention transmits, to the communication terminal having a single subcarrier composing the block, control information instructing to perform OFDM transmission.

As described above, it becomes possible to perform flexible scheduling which selects, as simultaneously communicating terminals, communication terminals that perform OFDM transmission and communication terminals that perform transmission using other transmission methods (for example, single carrier transmission using adaptive spectrum allocation), because control information instructing to perform OFDM transmission is transmitted to the communication terminal having a single subcarrier composing the block.

According to the present invention, it is possible to avoid a situation where a block cannot be allocated for use by a communication terminal due to failure of reserving consecutive subcarriers, because communication terminals having different number of subcarriers composing the block are selected with a higher priority as simultaneously communicating terminals, and a block for use by the simultaneously communicating terminals is allocated within an available band. Accordingly, it becomes possible to flexibly allocate subcarriers.

Figure 1:
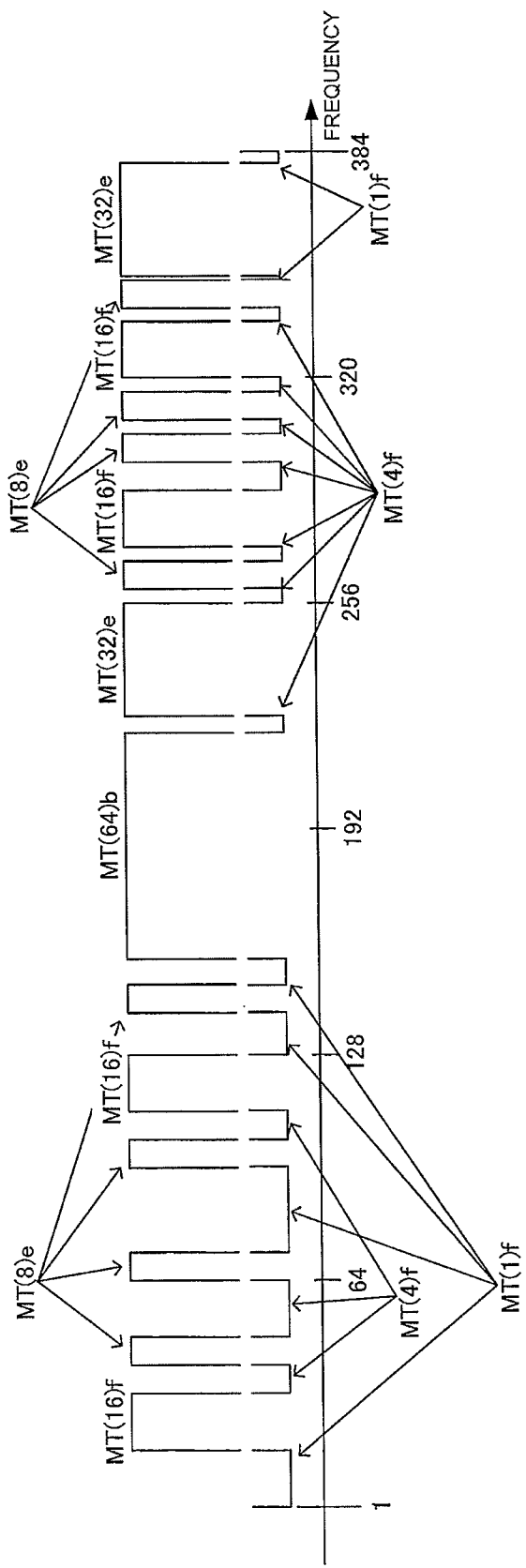
FIG. 1 shows an exemplary result of spectrum allocation when grouping shown in table 2 is performed by the scheduling method according to the present invention.

DENOTATION OF REFERENCE NUMERALS 10, 20 receiving unit
11 transmitting unit
12 scheduling unit
100 antenna unit
101 radio unit
102 A/D conversion unit
103 synchronization unit
104 GI removing unit
105 S/P conversion unit
106 FFT unit
107 subcarrier demapping unit
108 equalizing unit
109 IDFT unit
110 demodulation/error correction decoding unit
111 down-link transmission signal generating unit
112 D/A conversion unit
113 radio unit
114 antenna unit 200 SC-FDMA signal processing unit
201 OFDM signal processing unit
202 data selection unit
203 channel estimation unit
204 channel compensation unit
1000 coding unit
1001 modulation unit
1002 S/P conversion unit
1003 DFT unit
1004 subcarrier mapping unit
1005 IFFT unit
1006 P/S conversion unit
1007 GI insertion unit
1008 D/A conversion unit
1009 radio unit
1010 antenna unit
2000 switching unit

BEST MODES FOR CARRYING OUT THE INVENTION

Embodiments of the present invention will be described below referring to the accompanying drawings. First, a scheduling method according to the present invention will be outlined. The above problem arises due to the fact that only the terminals of a large block size are selected as simultaneous access terminals, because conventional scheduling methods of selecting simultaneous access terminals do not at all consider the block size of subcarriers for use by each terminal. The scheduling method according to the present invention, on the contrary, groups the terminals that use subcarriers whose block sizes are the same or within a predefined range, and selects simultaneous access terminals from each group. Thus it becomes possible to avoid a situation where a terminal cannot be allocated due to failure of reserving consecutive subcarriers by performing scheduling in consideration of the block size of subcarriers for use by each terminal while selecting subcarriers according to the channel condition.

First Embodiment

A first embodiment exemplifies a specific case of applying the present invention to a situation where communication terminals (simply referred to as "terminals", hereinafter) shown in table 1 are distributed within a cell. Here, it is assumed that all the terminals shown in table 1 perform uplink communication by SC-FDMA transmission, which performs spectrum allocation using SC-ASA (Single Carrier-Adaptive Spectrum Allocation).

As described above, the simultaneous access terminal selection (scheduling) method according to the present invention groups the terminals having the same block size of subcarriers to be used (value L of table 1), so that grouping such as shown in table 2 is performed first. In table 2, the terminals surrounded by dashed lines are defined as groups by the scheduling method according to the present invention, resulting in six groups here.

TABLE 2

| | Terminal ID | Block size (L) | Number of blocks (M) | Number of subcarriers used (N) |
|---|---|---|---|---|
| Group 1 | MT(64)a ~ MT(64)f | 64 | 1 | 64 |
| Group 2 | MT(32)a ~ MT(32)c | 32 | 1 | 32 |
| | MT(32)d ~ MT(32)f | 32 | 2 | 64 |
| Group 3 | MT(16)a ~ MT(16)b | 16 | 1 | 16 |
| | MT(16)c ~ MT(16)d | 16 | 2 | 32 |
| | MT(16)e ~ MT(16)f | 16 | 4 | 64 |
| Group 4 | MT(8)a ~ MT(8)b | 8 | 2 | 16 |
| | MT(8)c ~ MT(8)d | 8 | 4 | 32 |
| | MT(8)e ~ MT(8)f | 8 | 8 | 64 |
| Group 5 | MT(4)a ~ MT(4)b | 4 | 4 | 16 |
| | MT(4)c ~ MT(4)d | 4 | 8 | 32 |
| | MT(4)e ~ MT(4)f | 4 | 16 | 64 |
| Group 6 | MT(1)a ~ MT(1)b | 1 | 16 | 16 |
| | MT(1)c ~ MT(1)d | 1 | 32 | 32 |
| | MT(1)e ~ MT(1)f | 1 | 64 | 64 |

※ $N = L \times M$

After the grouping shown in table 2, the scheduling method according to the present invention next selects simultaneous access terminals from each group. Although the selection criterion in this case may be round-robin within a group, multi-user diversity effect can be exhibited by selecting the terminal that has shown the largest improvement in reception power in a group (PF method in a group) while preserving fairness among users. The terminals that have been selected as described above are the simultaneous access terminals selected using the scheduling method according to the present invention. By selecting simultaneous access terminals in this manner, it is possible to avoid a situation where only the terminals having large block sizes are selected, and to facilitate allocation of spectra to all the terminals selected as simultaneous access terminals.

FIG. 1 shows an exemplary result of spectrum allocation when grouping shown in table 2 is performed by the scheduling method according to the present invention. In FIG. 1, similarly with FIG. 13, the ranges surrounded by rectangles express the subcarriers allocated to respective terminals. Here, two types of rectangles, open-topped and open-bottomed, are used to clarify each range of allocation and, using them together, all the available subcarriers are allocated to the terminals. In this example, however, it is assumed that one terminal is selected from each group as a simultaneous access terminal, and the selected terminals are the six terminals shown in the upper part of FIG. 1 (MT(64)b, MT(32)e, MT(16)f, MT(8)e, MT(4)f and MT(1)f, where the number of subcarriers required for these terminals is 384 in all). Additionally, when allocating a spectrum to each of the selected terminals, it is assumed that a spectrum with a good reception status among the unallocated spectra is allocated to each terminal in descending order of the block size staring from the terminal having the largest block size (the leftmost one shown in the upper part of FIG. 1).

Figure 13:
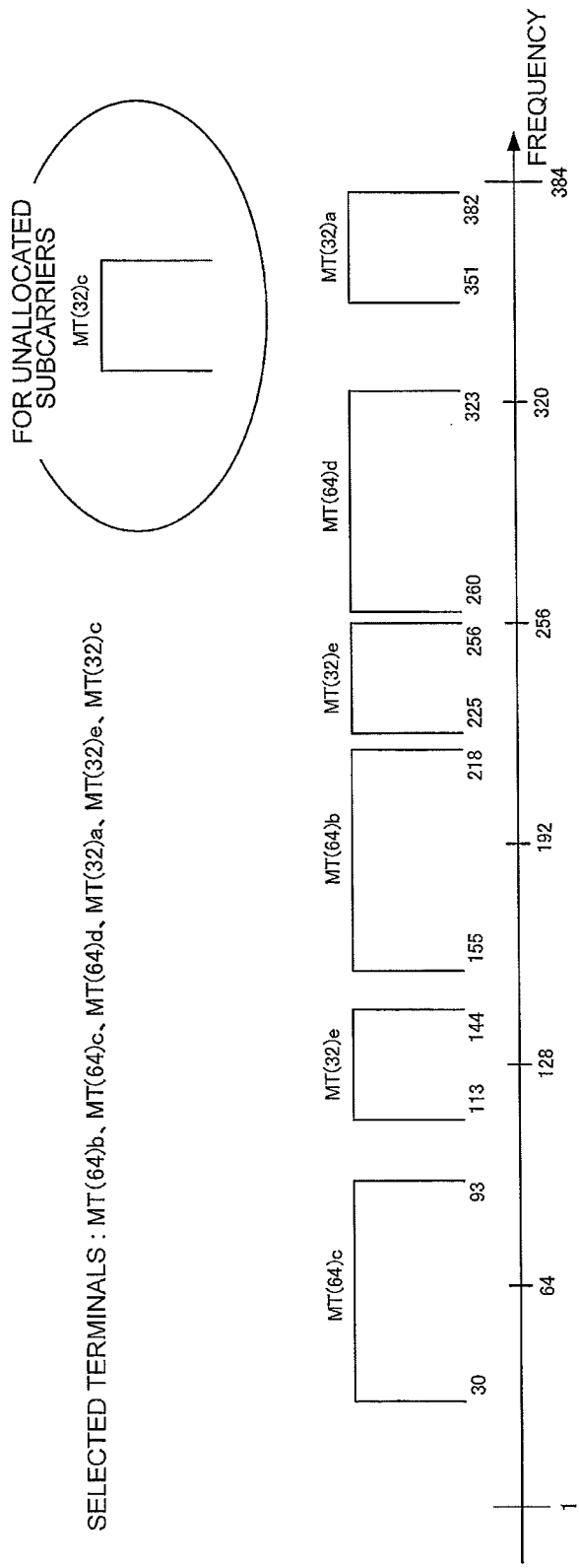
FIG. 13 shows an exemplary situation where a subcarrier cannot be allocated depending on the block size and the position of the subcarrier selected by each terminal.

As described above, although it may seem that spectrum allocation to each terminal is much more difficult than in the situation shown in FIG. 13 if the number of subcarriers for use by the selected simultaneous access terminals is equal to the total number of subcarriers, spectrum allocation to all the terminals selected as simultaneous access terminals has been realized, as shown in FIG. 1. This is possible by grouping terminals that use subcarriers of the same block size, and selecting terminals from respective groups (here, one terminal from each group) as simultaneous access terminals, so that terminals having various block sizes access simultaneously. In other words, a situation where only the terminals having a large block size are selected can be avoided, and thus there is less necessity to reserve consecutive spectra (because a terminal with a small block size can have a spectrum freely allocated thereto).

Figure 2:
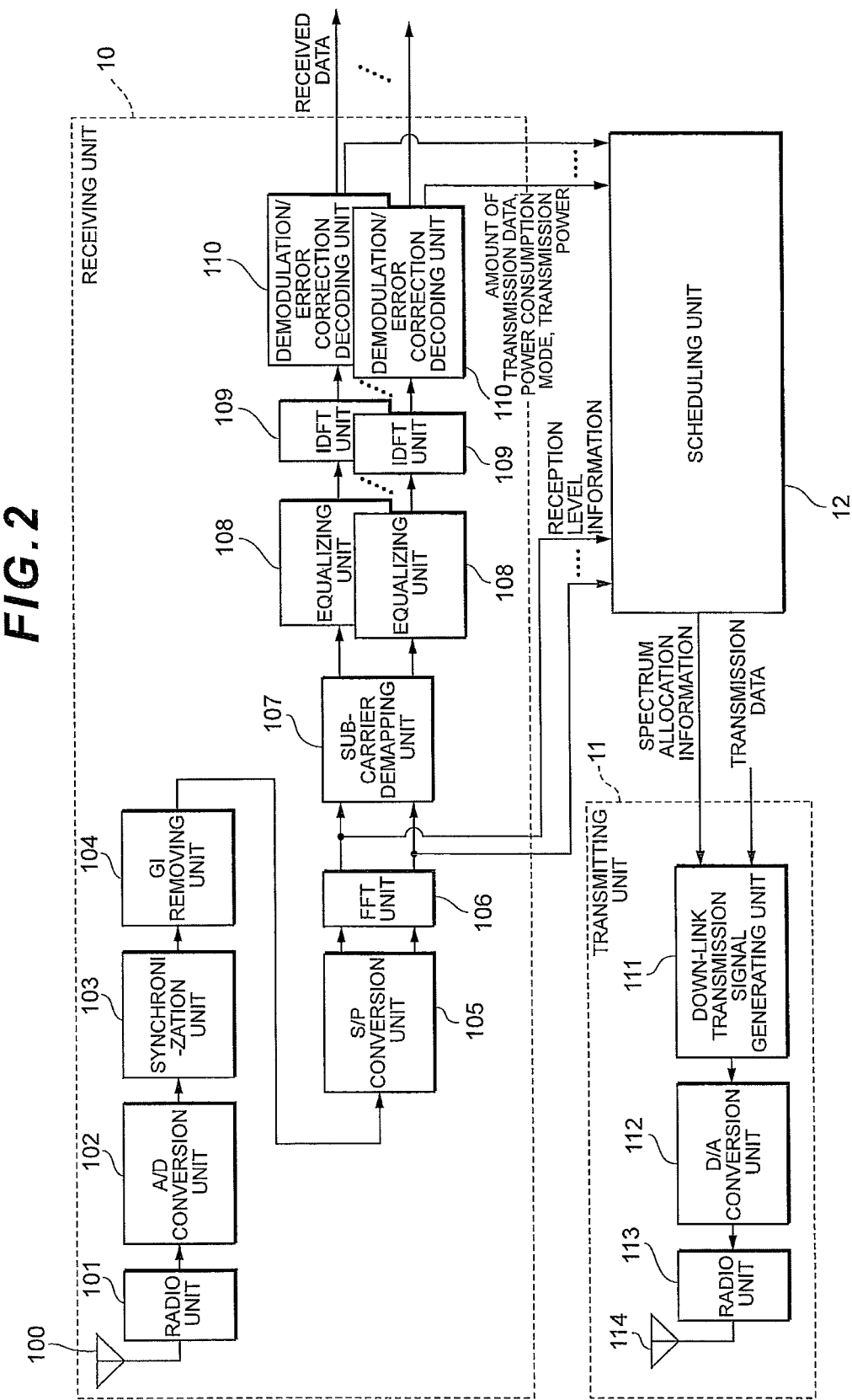
FIG. 2 is a block diagram showing a configuration of a base station apparatus that uses a scheduling method according to a first embodiment of the present invention.

FIG. 2 shows a configuration of the base station apparatus (simply referred to as "base station", hereinafter) as the control station apparatus that uses the scheduling method according to the present embodiment. As shown in FIG. 2, the base station according to the present embodiment includes a receiving unit 10, a transmitting unit 11, and a scheduling unit 12. The receiving unit 10 includes an antenna unit 100, a radio unit 101, an A/D conversion unit 102, a synchronization unit 103, a GI removing unit 104, an S/P conversion unit 105, an FFT unit 106, a subcarrier demapping unit 107, an equalizing unit 108, an IDFT unit 109, and a demodulation/error correction decoding unit 110. Here, it is assumed that the equalizing unit 108, the IDFT unit 109, demodulation/error correction decoding unit 110 or the like are provided as many as the assumed number of simultaneous access terminals.

The transmitting unit 11 includes a down-link transmission signal generating unit 111, a D/A conversion unit 112, a radio unit 113, and an antenna unit 114. Here, the scheduling method according to the present invention does not depend on down-link transmission methods (modulation method or multiplexing method of terminals), and thus the signals generated in the down-link transmission signal generating unit 111 may be OFDM signals or may be SC-FDMA signals.

When receiving a signal transmitted from a terminal at the base station shown in FIG. 2, the signal received at the antenna unit 100 is first converted into an A/D convertible frequency at the radio unit 101, and then converted into a digital signal at the A/D conversion unit 102. Next, symbol synchronization is established at the synchronization unit 103 and, after removing GI in each symbol at the GI removing unit 104, the time domain signal is converted into a frequency domain signal at the FFT unit 106 via the S/P conversion unit 105.

Since the above signal is generated by mapping, based on SC-ASA, signals of a plurality of terminals on a subcarrier used by each of the terminals, a process of grouping the subcarriers for each terminal is performed at the subcarrier demapping unit 107, and equalization of the frequency domain is performed at the equalizing unit 108. Additionally, a channel estimation process is also performed at the equalizing unit 108. Subsequently, signals transmitted from each of the terminals are IDFT-processed respectively at the IDFT unit 109 and, after having been converted into time domain signals, are demodulated and decoded at the demodulation/error correction decoding unit 110, and thereby the transmitted data is reproduced.

This process provides not only data but also information relating to the amount of uplink transmission data, the power consumption mode of the terminal, and transmission power notified from the terminal. In addition, information relating to the channel condition (reception level) of signals transmitted from each terminal is measured in the frequency domain after FFT when receiving a reception level measurement signal transmitted from the terminal.

The data from the terminal obtained at the receiving unit 10 is output to an upper layer (not shown). In addition, information relating to the amount of transmission data, power consumption mode, and transmission power notified from each terminal is sent to the scheduling unit 12 and used for scheduling (selection of simultaneous access terminals) which will be described in detail below. The result of scheduling in the scheduling unit 12 is sent to the down-link transmission signal generating unit 111 as spectrum allocation information that notifies the spectrum for use by each terminal when performing the next uplink transmission, and converted into a down-link transmission signal. After having been converted into an analog signal at the D/A conversion unit 112, together with the transmission data similarly converted into a down-link transmission signal, the signal is converted into a transmittable frequency at the radio unit 113 and transmitted from the antenna unit 114.

Figure 3:
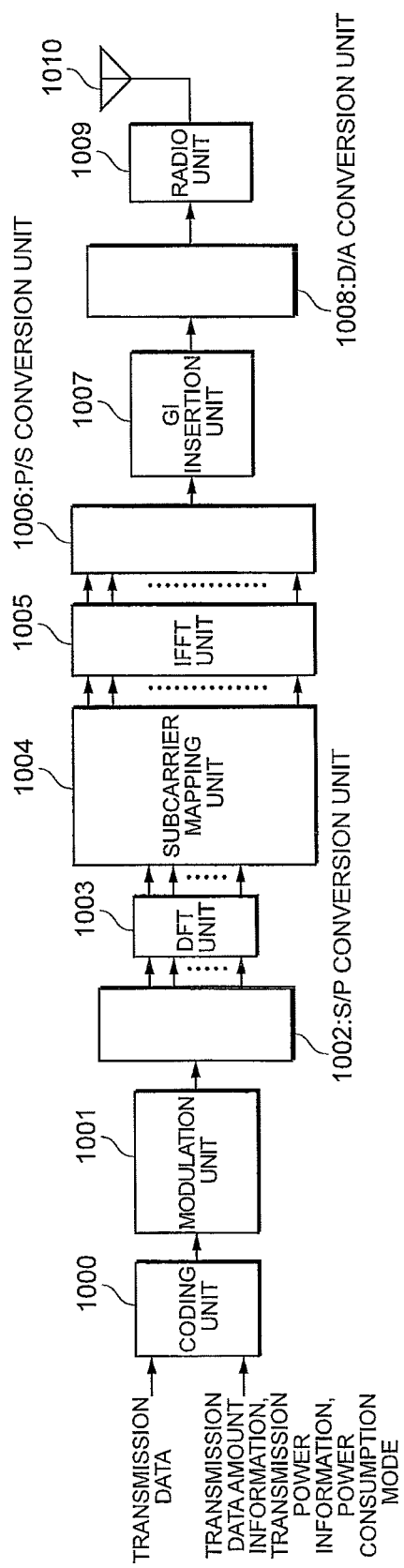
FIG. 3 is a block diagram showing a configuration of a transmission device of a terminal communicating with the base station that uses the scheduling method according to the first embodiment.
Figure 11:
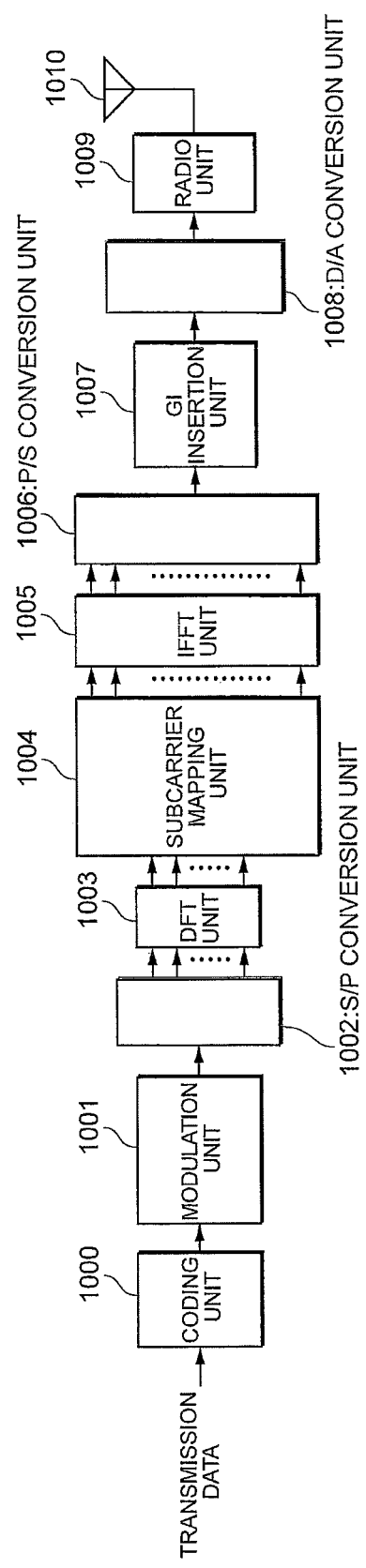
FIG. 11 is a block diagram showing a configuration of a transmission device at the terminal using SC-FDMA.
Figure 12A:
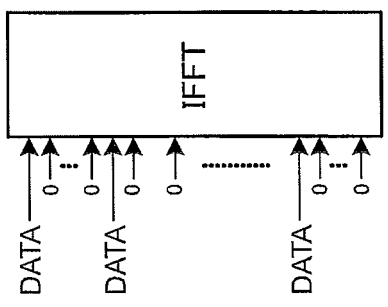
FIGS. 12A and 12B are explanatory diagrams illustrating a technique proposed as a spectrum control method that preserves low PAPR characteristic in 3GPP.
Figure 12B:
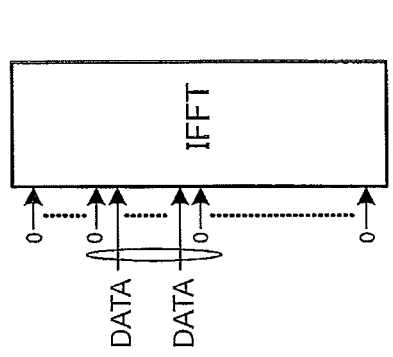

FIG. 3 shows a configuration of a transmission device of a terminal communicating with the base station that uses the scheduling method according to the present embodiment. Here, in the transmission device shown in FIG. 3, components having identical functions as those in FIG. 11 are provided with identical reference numerals and their description is omitted. As shown in FIG. 3, the transmission device of the terminal communicating with the base station that uses the scheduling method according to the present invention is configured to notify, as well as the transmission data, information relating to the amount of transmission data, the transmission power, and the power consumption mode (remaining battery level) to the base station. However, the information is notified in order to determine the number of subcarriers and block size required for data transmission, and is not limited to the above as long as it can determine the number of subcarriers and block size. In addition, the number of subcarriers and block size themselves may be notified from the terminal to the base station.

Figure 4:
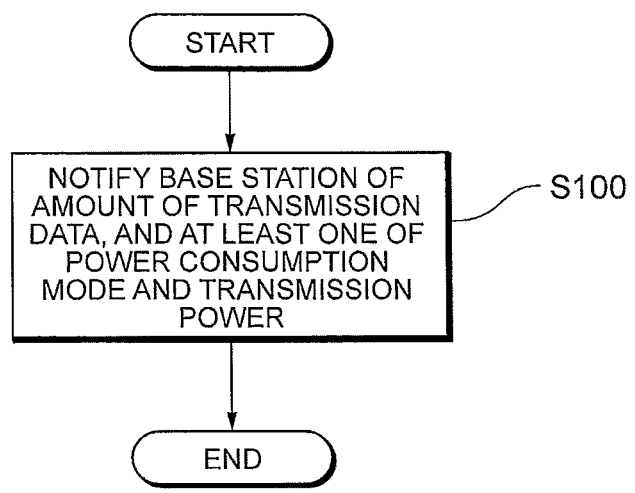
FIG. 4 is a flow chart illustrating the control of the terminals by the scheduling method according to the first embodiment.

Control of the terminals and the base station by the scheduling method according to the present embodiment will be described below referring to FIGS. 4 and 5. FIG. 4 is a flow chart illustrating the control of the terminals by the scheduling method according to the present embodiment, and FIG. 5 is a flow chart illustrating the control of the base station by the scheduling method according to the present embodiment.

In the scheduling method according to the present embodiment, as shown in FIG. 4, each terminal notifies the base station connected thereto of the information relating to the amount of data to be transmitted (amount of data in a transmission buffer), and at least one of power consumption mode and transmission power (S100). The information need not be notified constantly (e.g., for every frame), and it suffices to notify the power consumption mode when starting communication. Additionally, information relating to the type of transmission media such as whether it is a voice call or uploading of video image may be notified instead of the amount of transmission data. Based on the information notified from each terminal in a cell, the number of subcarriers to be allocated to each terminal and the size of blocks into which those subcarriers are grouped will be determined in the base station.

Figure 5:
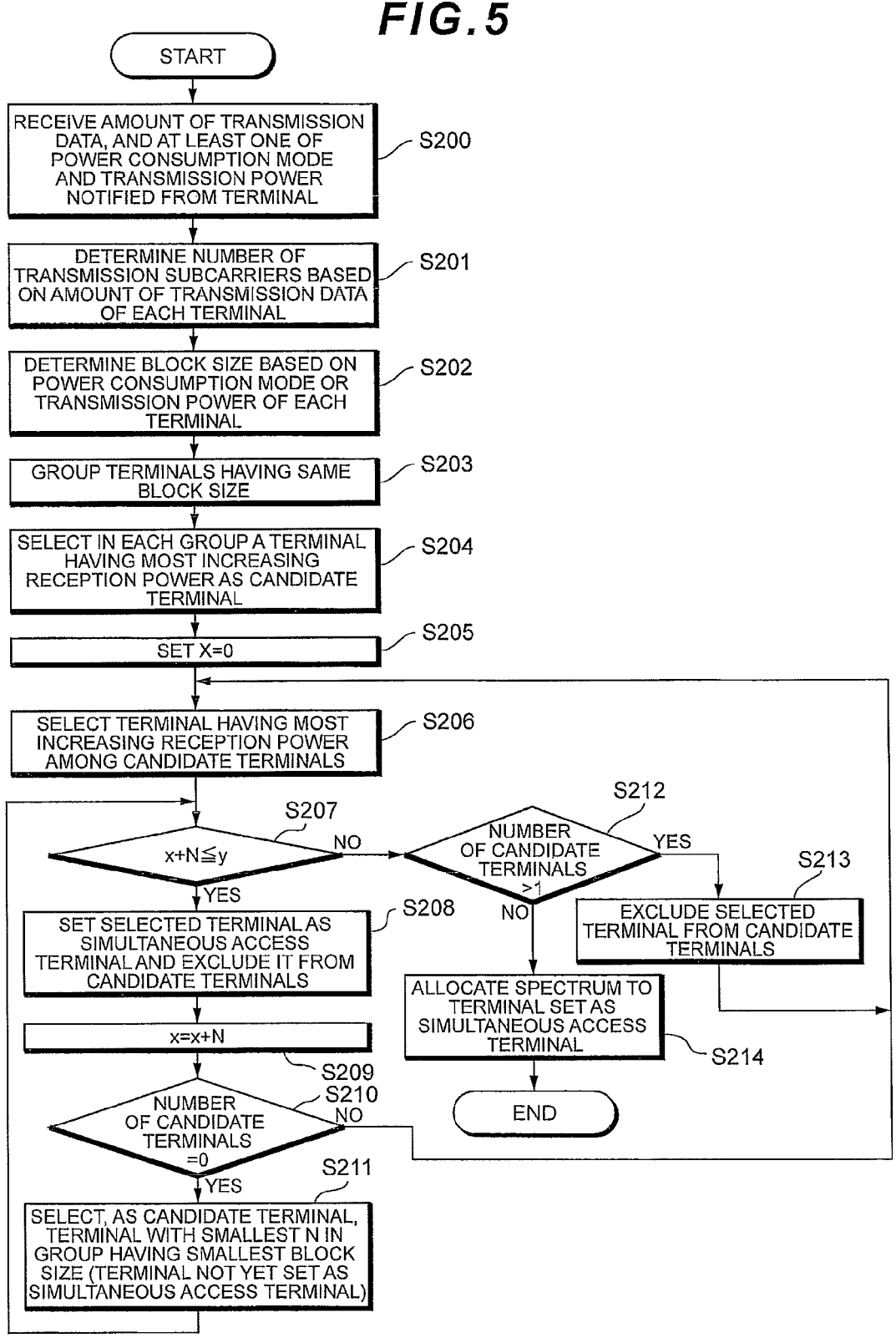
FIG. 5 is a flow chart illustrating the control of the base station by the scheduling method according to the first embodiment.

As shown in FIG. 5, the base station first receives information relating to the amount of transmission data, and at least one of power consumption mode and transmission power notified from each terminal (S200). The base station then determines the number of transmission subcarriers based on the received amount of transmission data, as well as determining the block size based on the information relating to power consumption mode and transmission power (S201, S202). Next, the base station groups the terminals having the same block size of subcarriers determined at S202 (S203). This is a process of grouping the terminals having the same block size L as specifically shown in table 2. However, if there are a very large number of types of block size for use by the terminals, it may be possible to group the terminals having block sizes within a predefined range, instead of grouping the terminals having a completely matching block size such as shown in table 2.

Having performed the grouping as described above, the scheduling method according to the present embodiment selects a terminal from each group as a candidate of simultaneous access terminal (a candidate to which spectrum allocation is performed at the next uplink transmission) (S204). The terminal selecting method in this case is not particularly defined in the present invention. The scheduling method according to the present embodiment employs a method that selects a terminal from each group having the largest difference between the instantaneous reception power and the average reception power (having the most increased instantaneous reception power) as the selecting method that exhibits multi-user diversity effect, while preserving fairness among the terminals of the opportunity to be selected. The terminal selected from each group in the above manner is referred to as a "candidate terminal" in the present embodiment.

After the candidate terminal has been selected, a variable x is set to zero (S205). The variable x expresses the total number of subcarriers for use by a terminal selected as a simultaneous access terminal. The terminal having the most increased instantaneous reception power is selected among the candidate terminals selected at S204 (S206). However, the selection method at S206 is not particularly defined in the present invention, as with the case of S204.

Next, it is determined whether or not the sum (x+N) of the number of subcarriers (N in table 2) for use by the terminal selected at S206 and the variable x is not more than a predefined number y (S207). Here, y is a positive integer not more than the number of subcarriers available in the system (384 in the example shown in FIG. 1), which is a parameter limiting the number of subcarriers that can be allocated to a terminal. The value of y may vary for each cell depending on the cell allocation situation or traffic of surrounding cells.

If it is determined at S207 that the sum (x+N) of x and N is not more than y, in other words, if the total number of the subcarriers to be used falls within a predefined range assuming that the terminal selected at S206 is a simultaneous access terminal, the terminal selected at S206 is set as a simultaneous access terminal (S208). In addition, the terminals set as simultaneous access terminals in this manner are excluded from candidate terminals at S208.

Next, the number of subcarriers (N) for use by the terminals that have been set as simultaneous access terminals at S208 is added to the variable x, and thereby the variable x is updated (S209). Subsequently, it is determined whether the number of candidate terminals selected at S204 is zero or not (S210) and, if the number of candidate terminals is not zero, in other words, if there are candidate terminals remaining, the process flow returns to S206 to repeat the processes thereafter.

If, on the other hand, the number of remaining candidate terminals is zero, it indicates that, although candidate terminals of all the groups have already been set as simultaneous access terminals, there still remain available subcarriers. Therefore, the scheduling method according to the present embodiment selects, as a candidate terminal, the terminal having the smallest number (N) of subcarriers to be used in the group having the smallest block size (L) (MT(1)a or MT(1)b in the example shown in table 2) (S211), and performs the processes of S207 and later. However, it is assumed that the terminals selected here have not yet been set as simultaneous access terminals, and if there is a plurality of candidate terminals, the terminal having the most increased instantaneous reception power is selected as a candidate terminal as shown in S206.

As described above, the reason why a candidate terminal is selected among the group of the smallest block size when there are available subcarriers remaining is that, although allocation of subcarriers becomes more complicated as the number of subcarriers to be used (number of simultaneous access terminals) increases so that the problem as shown in FIG. 13 arises, spectrum allocation can be performed relatively freely to terminals having a smaller block size, and thus such a problem can be suppressed. By performing the above process, simultaneous access terminals that can efficiently use available subcarriers can be selected without increasing the complexity of spectrum allocation.

If it is determined at S207 that the sum (x+N) of x and N is larger than y, i.e., the total number of subcarriers to be used is larger than a predefined range when the terminal selected at S206 is set as a simultaneous access terminal, it is determined whether the number of candidate terminals is larger than one or not (S212). If it is determined that the number of candidate terminals is larger than one, which indicates that determination at S207 has not been performed for the terminals of all the groups, the process flow returns, after excluding the selected terminal from the candidate terminals (S213), to S206 where the process is repeated.

Although it is determined at S207 that the sum of x and N is larger than y when there are very many subcarriers (N is very large) for use by the terminal selected at S206, there may possibly exist a candidate terminal having a smaller number of subcarriers for use in another group, and thus the above process is performed in order to check for such a terminal and, if possible, select it as a simultaneous access terminal.

If, on the other hand, it is determined that the number of candidate terminals is not more than one, which indicates that determination at S207 has been performed for candidate terminals of all the groups, selection of simultaneous access terminals may be finished. In this case, spectrum allocation is performed respectively to the simultaneous access terminals selected by the scheduling method according to the present embodiment (S214), and control of the base station side is completed. Note that the method of allocating spectra at S214 is not particularly defined in the present invention, and a method such as allocating spectra to the terminals in descending order of the block size. Information relating to spectra allocated in such a manner is notified from the base station to respective terminals via down-link, and respective terminals perform uplink communication using the allocated spectra.

In the process of S204, it is assumed to select the terminal (a single terminal) having the most increased reception power in each group as a candidate terminal. However, selecting only one terminal from each group and setting it as a simultaneous access terminal may result in a situation where many subcarriers are not used when there are many available subcarriers, when there are not many groups, or when there are not many terminals that desire uplink transmission although there are many groups. Therefore, in such a case, a plurality of candidate terminals may be selected from each group at S204.

Additionally, in the process of S211, although it is assumed that candidate terminals are selected from the group of the smallest block size, selection may be performed from a group having a block size not more than a threshold value. Furthermore, the process of S211 may be omitted so that the process flow proceeds from S210 to S214.

As described above, because the scheduling method according to the first embodiment selects terminals that use blocks of different sizes as simultaneous access terminals with a higher priority, and allocate blocks for use by the simultaneous access terminals within available bands, it becomes possible to avoid a situation where only the terminals having a large block size are selected, so that efficient allocation of available subcarriers can be facilitated. Particularly, because blocks for use by respective terminals that have been selected as simultaneous access terminals are assigned to frequencies with which signals from respective terminals are received in a good reception situation based on the channel condition, it becomes possible to facilitate efficient allocation of available subcarriers while selecting the subcarriers according to the channel condition.

Second Embodiment

The scheduling method according to the first embodiment first selects simultaneous access terminals, and performs spectrum allocation to each of the selected simultaneous access terminals. When performing selection of simultaneous access terminals and spectrum allocation separately as described above, a spectrum having good channel condition may not necessarily be allocated to a selected terminal. This is because spectrum allocation to a terminal having a smaller block size is performed with a lower priority when performing spectrum allocation to the terminals in descending order of the block size, for example, and selection must be performed among the remaining spectra (that have not been selected for terminals having a higher priority of spectrum allocation). On the contrary, a scheduling method according to the second embodiment performs selection of simultaneous access terminals and spectrum allocation to the selected terminals at the same time.

Figure 6:
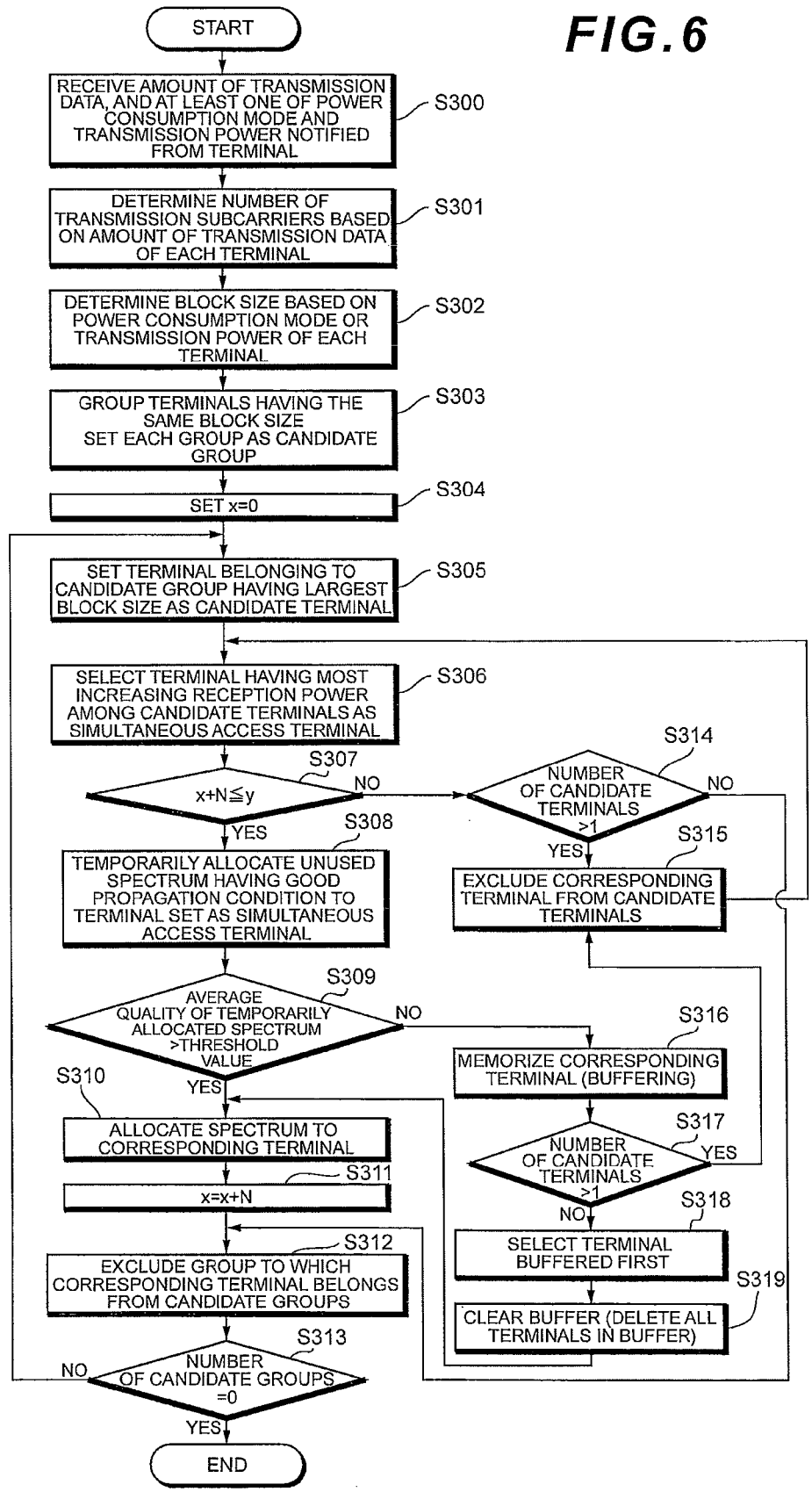
FIG. 6 is a flow chart illustrating the control of the base station by a scheduling method according to a second embodiment of the present invention.

Control of the terminals and the base station by the scheduling method according to the present embodiment will be described below. FIG. 6 is a flow chart illustrating the control of the base station by the scheduling method according to the present embodiment. Since control of the terminals by the scheduling method according to the second embodiment is identical to that shown in FIG. 4, description thereof will be omitted.

As shown in FIG. 6, the base station first receives information relating to the amount of transmission data, and at least one of power consumption mode and transmission power notified from each terminal (S300). The base station then determines the number of transmission subcarriers based on the received amount of transmission data, as well as determining the block size based on the information relating to power consumption mode and transmission power (S301, S302). Next, the base station groups the terminals having the same block size of subcarriers determined at S302. Similarly with the first embodiment, this is a process of grouping the terminals having the same block size L (or within a predefined range) (see table 2). Additionally, at S303, each of the obtained groups is set as a candidate group.

After each group has been set as a candidate group, the variable x is set to zero (S304). Similarly with the first embodiment, the variable x expresses the total number of subcarriers for use by a terminal selected as a simultaneous access terminal. Next, the scheduling method according to the present embodiment selects a candidate group having the largest block size and sets a terminal belonging to the candidate group as a candidate terminal (S305).

Although it is preferred that selection of the candidate group at S305 is performed in descending order of the block size considering ease of spectrum allocation, it is not necessarily limited to descending order. The terminal having the most increased instantaneous reception power is selected from the candidate terminals thus set, as a simultaneous access terminal (S306). Here again, the method of selecting a simultaneous access terminal from a group is not particularly limited by the present invention.

After a simultaneous access terminal has been selected at S306, it is determined whether or not the sum (x+N) of the number of subcarriers for use by the terminal (N in table 2) and the variable x is not more than a predefined number y (S307). Similarly with the first embodiment, y is a positive integer not more than the number of subcarriers available in the system (384 in the example shown in FIG. 1), which is a parameter limiting the number of subcarriers that can be allocated to a terminal.

If it is determined at S307 that the sum (x+N) of x and N is not more than y, that is, the total number of the subcarriers to be used falls within a predefined range assuming that the terminal selected at S306 is a simultaneous access terminal, a spectrum is temporarily allocated to the terminal selected at S306 (S308). This temporary allocation is a process of allocating, among the spectra that have not yet been allocated to any of the terminals (unused spectra), a spectrum to the selected terminal to provide it with a good channel condition according to the block size.

Subsequently, average quality of the temporarily allocated spectrum is compared with a predefined threshold value (S309). If it is determined that the average quality of the temporarily allocated spectrum is higher than the threshold value as a result of comparison at S309, the spectrum is allocated to the corresponding terminal (actual allocation: S310). After the value of variable x has been updated (S311), the group to which the terminal (corresponding terminal) that has a spectrum allocated thereto belongs is excluded from the candidate group (S312).

Next, it is determined whether the number of remaining candidate groups is zero or not (S313). If the number of candidate groups is not zero, in other words, there still remains a group that does not have a spectrum allocated, the process flow returns to S305 where later processes are repeated. If, on the other hand, the number of remaining candidate groups is zero, scheduling in the present embodiment is completed.

If it is determined at S307 that the sum (x+N) of x and N is larger than y, i.e., the total number of subcarriers to be used is larger than a predefined range when the terminal selected at S306 is set as a simultaneous access terminal, it is determined whether the number of candidate terminals is larger than one or not (S314). If it is determined at S314 that the number of candidate terminals is larger than one, which indicates that there is another candidate terminal in the corresponding group, the process flow returns, after excluding the selected terminal from the candidate terminals (S315), to S306 where the process is repeated.

Although it is determined at S307 that the sum of x and N is larger than y when there are very many subcarriers (N is very large) for use by the terminals selected at S306, there may possibly exist another candidate terminals having a smaller number of subcarriers for use in the group, and thus the above process is performed in order to check for such a terminal and, if possible, select it as a simultaneous access terminal. If, on the other hand, it is determined that the number of candidate terminals is not more than one, which indicates that determination at S307 has been performed for all the terminals in the group, the process flow proceeds to S312 where selection of simultaneous access terminals in the corresponding group may be finished.

If it is determined as a result of comparison at S309 that the average quality of the temporarily allocated spectrum is not more than the threshold, the corresponding terminal is temporarily memorized (buffered), because spectrum allocation may not be performed efficiently (S316). It is then determined whether or not there is another candidate terminal (S317). If it is determined at S317 that the number of candidate terminals is larger than one, which indicates that there is another candidate terminal in the corresponding group, the process flow returns, after excluding the selected terminal from the candidate terminals (S315), to S306 where the process is repeated.

If, on the other hand, it is determined at S317 that the number of candidate terminals is not more than one, there is no candidate terminal other than the corresponding terminal. In this case, the terminal that has been buffered first at S316, i.e., the terminal having the most increasing instantaneous reception power in the corresponding group is selected (S318). Subsequently, after all the memorized terminals have been cleared (S319), the process flow proceeds to S310 where spectrum allocation is performed. This indicates that, when all terminals in a group do not satisfy the condition of S309, a spectrum is allocated to the terminal having the most increasing instantaneous reception power. The information relating to the spectrum thus allocated is notified to each terminal from the base station via down-link, and each terminal performs uplink communication using the allocated spectrum.

As described above, because the scheduling method according to the second embodiment performs selection of simultaneous access terminals and spectrum allocation at the same time, allocation to a terminal having a better spectrum channel condition can be performed, while avoiding a situation where only the terminals having a large block size are selected.

Third Embodiment

Although, in the scheduling method according to the first and the second embodiments, it is assumed that all the terminals in a cell perform uplink communication using SC-FDMA transmission (SC-ASA), a situation can also be conceived where terminals performing uplink communication using OFDM transmission coexist. In other words, spectrum allocation is flexible for a terminal located near the base station with sufficient battery level left because it does not have to consider PAPR characteristic so much, and further, higher frequency usage efficiency can be realized by using OFDM transmission to which technology such as adaptive modulation per subcarrier can be applied. The scheduling method according to a third embodiment therefore performs scheduling, considering the size of the subcarriers to be grouped into blocks in a situation where terminals performing SC-FDMA transmission coexist with terminals performing OFDM transmission.

Figure 7:
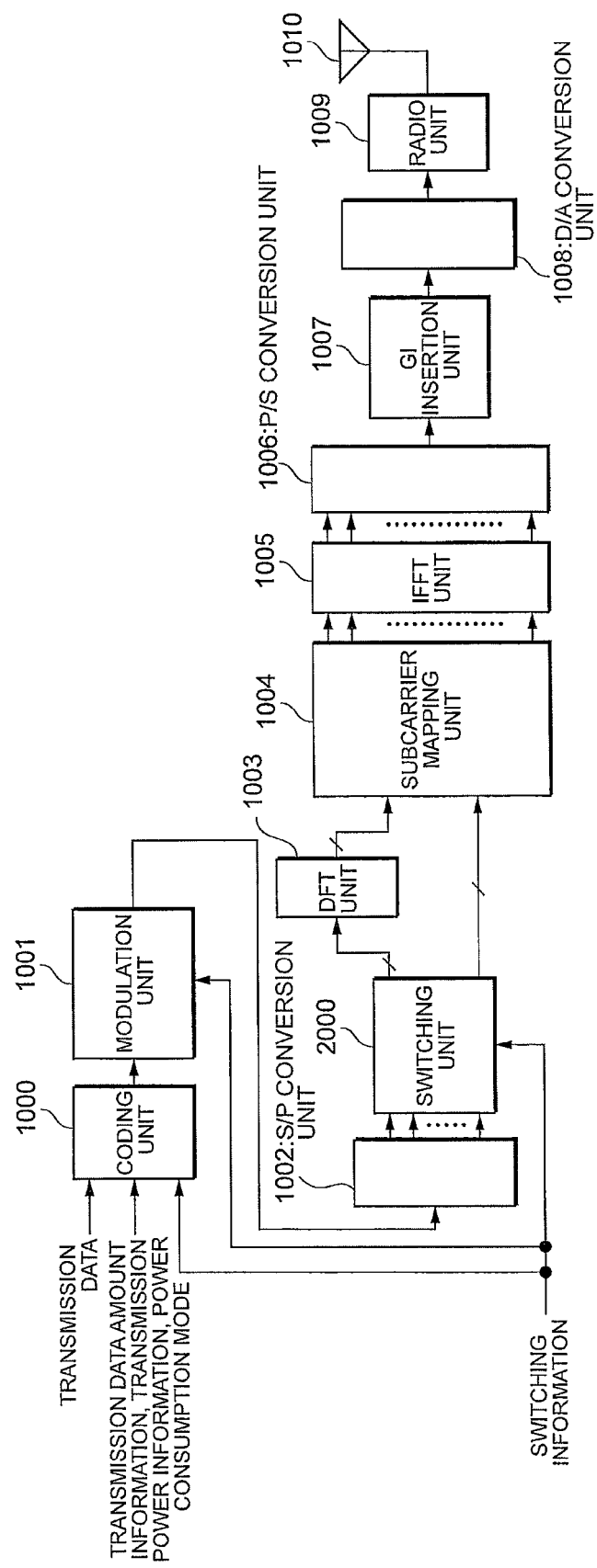
FIG. 7 is a block diagram showing a configuration of a transmission device of a terminal to which a scheduling method according to a third embodiment of the present invention is applied.

FIG. 7 shows a configuration of a transmission device of a terminal to which the present embodiment is applied. Here, components having identical functions as those in FIG. 3 are provided with identical reference numerals and their description is omitted. As shown in FIG. 7, the terminal-side transmission device that switches between OFDM transmission and SC-FDMA transmission that uses SC-ASA depending on the situation (distance from the base station or battery level left) is different from the transmission device according to the first embodiment in that it includes a switching unit 2000.

Based on switching information sent from an upper layer (not shown), the switching unit 2000 performs a process of inputting the output from the S/P conversion unit 1002 directly to the subcarrier mapping unit 1004 when performing OFDM transmission and inputting the signal converted into the frequency domain by the DFT unit 1003 to the subcarrier mapping unit 1004 when performing SC-FDMA transmission.

The switching information is information for instructing the switching between OFDM transmission and SC-FDMA transmission, according to at least one of the distance from the base station, the required transmission power, and its own battery level left (power consumption mode) which are estimated by measuring the reception power of signals transmitted from the base station. Respective units are instructed to perform OFDM transmission when the distance from the base station is small and thus a large transmission power is not required or a sufficient battery level is left, and to perform SC-FDMA transmission when a large transmission power is required or during operation in the low power consumption mode.

The switching information is also notified to the modulation unit 1001 to be used for switching between modulation of multi-carrier signals and modulation of single carrier signals (specifically, switching regarding whether or not to perform different modulation for each subcarrier). Additionally, in the transmission device according to the present embodiment, the switching information is described about a case where it is notified to the base station together with the transmission data, as shown in FIG. 7. This is not limiting, however, and thus it may be configured to determine switching at the base station according to other information (transmission power information, power consumption mode) notified from a terminal, and transmit control information to instruct each terminal of the switching. In this case, the switching information shown in FIG. 7 is not used, and the terminals receive switching information transmitted from the base station.

Figure 8:
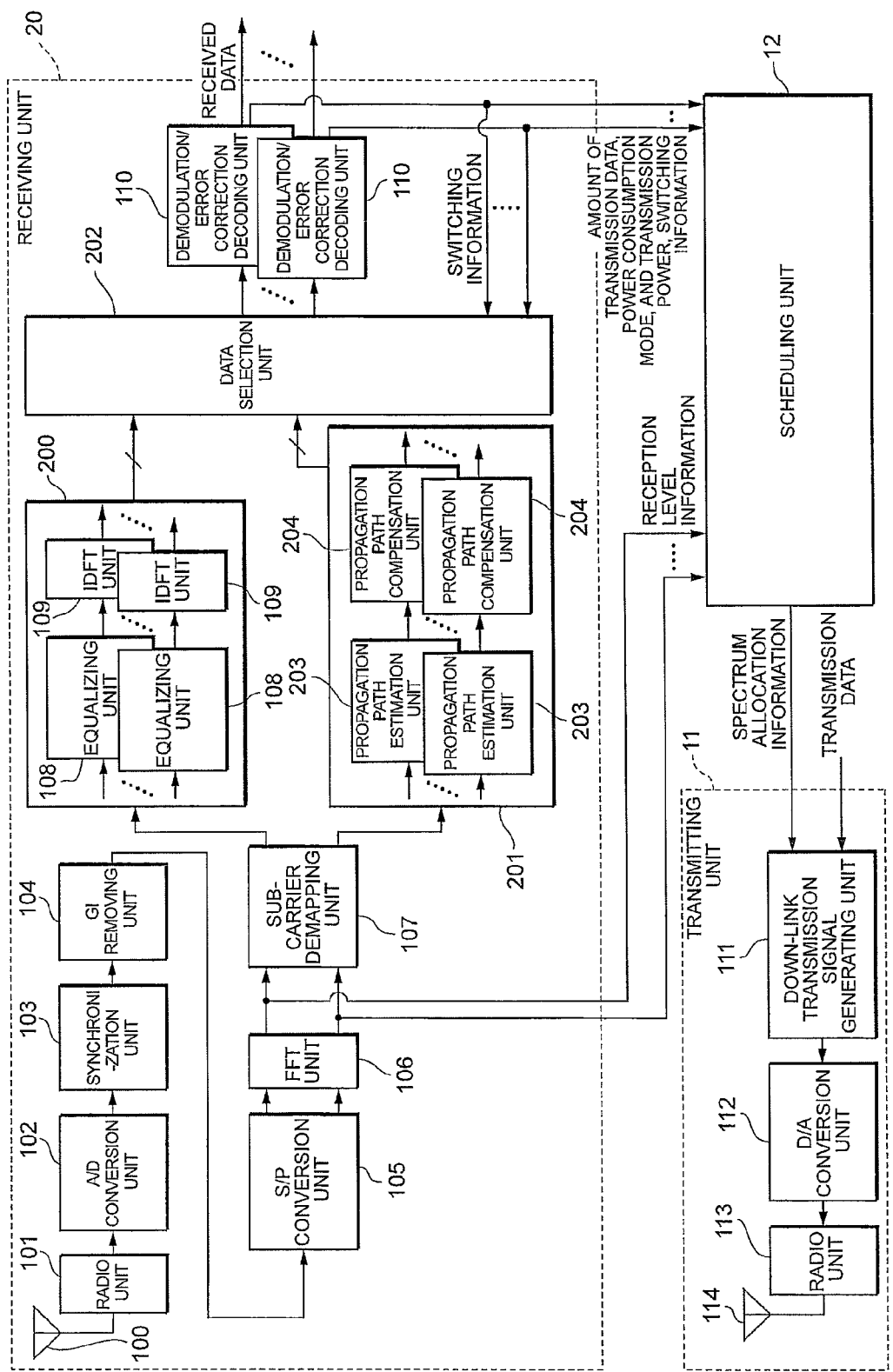
FIG. 8 is a block diagram showing a configuration of a base station that uses the scheduling method according to the third embodiment.

FIG. 8 shows a device configuration of the base station that uses the scheduling method according to the present embodiment. In FIG. 8, components having identical functions as those in FIG. 2 are provided with identical reference numerals and their description is omitted. As shown in FIG. 8, the base station communicating with a terminal that switches between OFDM transmission and SC-FDMA transmission is different from the base station according to the first embodiment in that it includes a SC-FDMA signal processing unit 200, an OFDM signal processing unit 201, and a data selecting unit 202 in the receiving unit 20.

Based on the switching information preliminarily notified from the terminal, the receiving unit 20 processes the signals from the terminals that perform SC-FDMA transmission in the SC-FDMA signal processing unit 200, and processes the signals from the terminals that performs OFDM transmission in the OFDM signal processing unit 201. The receiving unit 20 then inputs the signals that have been equalized and channel-compensated in the frequency domain respectively to the decoding/error correction decoding unit 110 to recover the transmitted data. Here, it is assumed that the OFDM signal processing unit 201 includes a channel estimating unit 203 that estimates the channel and a channel compensation unit 204. By thus configuring the base station, respective signals can be demodulated even in a situation where terminals performing OFDM transmission coexist with terminals performing SC-FDMA transmission. Additionally, when switching between OFDM transmission and SC-FDMA transmission is determined at the base station and instructed to respective terminals as described above, the switching is determined at the scheduling unit 12 to generate control information. Control information relating to switching between OFDM transmission and SC-FDMA transmission is then transmitted together with the spectrum allocation information and the like from the transmitting unit 11 to each terminal.

Figure 9:
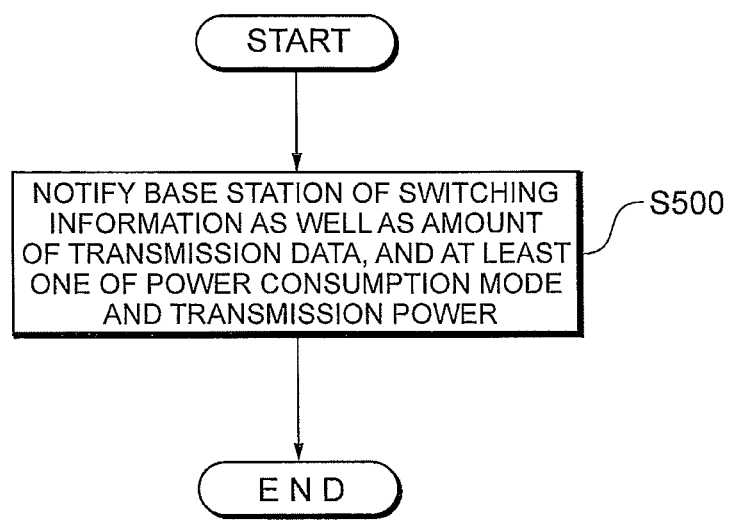
FIG. 9 is a flow chart illustrating the control of the terminals by the scheduling method according to the third embodiment.

Control of the terminals and the base station by the scheduling method according to the present embodiment will be described below, referring to FIGS. 9 and 10. FIG. 9 is a flow chart illustrating the control of the terminals by the scheduling method according to a third embodiment, and FIG. 10 is a flow chart illustrating the control of the base station by the scheduling method according to the third embodiment.

As shown in FIG. 9, in the scheduling method according to the present embodiment, each terminal transmits, to the base station connected thereto, switching information indicating which of OFDM transmission and SC-FDMA transmission will be performed, as well as the information relating to the amount of data to be transmitted (amount of data in a transmission buffer), and at least one of power consumption mode and transmission power (S500). The base station determines the number of subcarriers to be allocated to each terminal and the size of block for grouping the subcarriers, based on the information notified from each terminal in a cell. However, this switching information is not transmitted from the terminal when switching is determined at the base station.

Figure 10:
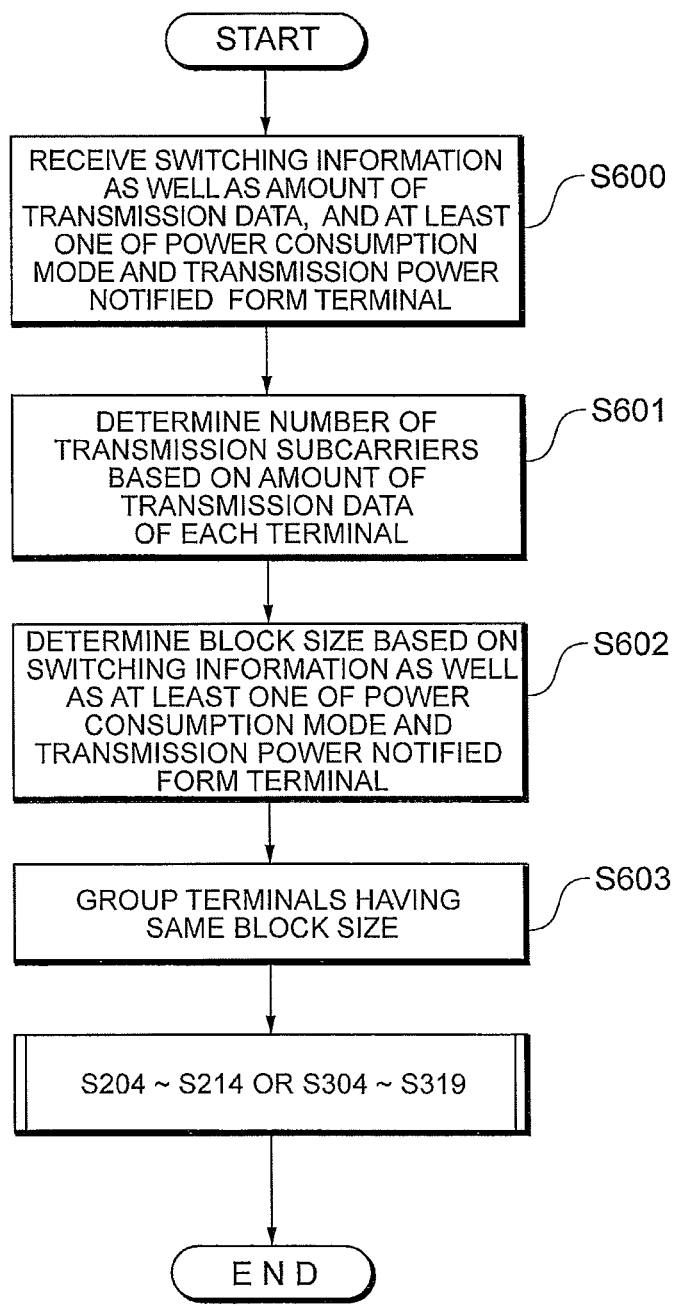
FIG. 10 is a flow chart illustrating the control of the base station by the scheduling method according to the third embodiment.

As shown in FIG. 10, the base station receives information relating to the amount of transmission data, and at least one of power consumption mode and transmission power and switching information notified from each terminal (5600). The base station then determines the number of transmission subcarriers based on the received amount of transmission data, as well as determining the block size based on the information relating to power consumption mode and transmission power, and switching information (S601, S602). However, for terminals performing OFDM transmission, it is assumed that block size is always one. Additionally, when switching is determined at the base station, it is determined whether OFDM transmission or SC-FDMA transmission is performed at S602, further processes are performed assuming that the block size of terminals performing OFDM transmission is one.

Next, terminals having the same block size of subcarriers determined at S602 are grouped (S603). Since the terminals performing OFDM transmission have a block size of one as described above, grouping is performed so that they belong to the same group as the terminals performing SC-FDMA transmission which also have a block size of one. Additionally, as shown in the first and second embodiments, grouping may be performed so that the terminals performing OFDM transmission belong to the corresponding group (group of a very small block size), or only the terminals performing OFDM transmission are treated as a separate group, when grouping terminals having block sizes within a certain range.

After the grouping has been performed, the process flow proceeds along the steps S204 to S214 described in the first embodiment and S304 to S319 described in the second embodiment. Then, selection of simultaneous access terminals is completed either after a spectrum is allocated at S214 to a terminal that has been set as a simultaneous access terminal, or if it is determined at S313 that the number of candidate groups is zero.

As described above, with the scheduling method according to the third embodiment, it becomes possible to perform scheduling in consideration of the size of the subcarriers to be grouped into a block even in a situation where terminals performing OFDM transmission coexist with terminals performing SC-FDMA transmission, by treating the block size of the terminals performing OFDM transmission as one.

The present invention is not limited to the above embodiments and can be implemented with various modifications. In the above embodiments, the sizes or shapes illustrated in the accompanying drawings are not limited thereto, and may be appropriately modified in a range to exhibit the effect of the invention. In addition, the invention can be implemented by appropriately modifying it without deviating from the scope of the object thereof.

The invention claimed is:

1. A base station apparatus comprising:
a scheduling unit configured to simultaneously allocate, to a first communication terminal, one or more first block composed of two or more contiguous subcarriers as an allocation unit and allocate, to a second communication terminal, one or more second block composed of two or more contiguous subcarriers as allocation unit;
a transmitting unit configured to transmit, to the first communication terminal, first information indicating the one or more first block, and transmit, to the second communication terminal, second information indicating the one or more second block; and
a receiving unit configured to receive, from the first communication terminal, a Discrete Fourier Transform-spread-OFDM (DFT-S-OFDM) signal transmitted using the first information and receive, from the second communication terminal, a Discrete Fourier Transform-spread-OFDM (DFT-S-OFDM) signal transmitted using the second information, wherein
the number of subcarriers composing of the second block is integral multiplication of the number of subcarriers composing of the first block in which the integral multiplication is a multiplication of two or more integers.

2. The base station apparatus according to claim 1, the second information includes information allocating two or more the second blocks, wherein a first block of the two or more second blocks and a second block of the two or more second blocks are non-continuously allocated.

3. The base station apparatus according to claim 1, wherein the DFT-S-OFDM signal transmitted from the first communication terminal is generated by Fourier transforming data, and arranging and inverse-Fourier transforming signals after the Fourier transformation, based on the received first information, and
the DFT-S-OFDM signal transmitted from the second communication terminal is generated by Fourier transforming data, and arranging and inverse-Fourier transforming signals after the Fourier transformation, based on the received second information.

4. The base station apparatus according to claim 1, wherein the scheduling unit is configured to simultaneously allocate, to the first communication terminal, the one or more first block as an allocation unit and allocate, to a third communication terminal, the one or more first block as an allocation unit.

5. A communication terminal comprising:
a Discrete Fourier Transform (DFT) unit configured to perform Fourier transform to convert a first time-domain signal into frequency-domain signals;
an mapping unit configured to allocate the frequency-domain signals to one or more first block as an allocation unit wherein the first block composed of two or more contiguous subcarriers;
an Inverse Discrete Fourier Transform (IDFT) unit configured to perform inverse Fourier transform to convert the allocated frequency-domain signals into a second time-domain signal; and
a radio unit configured to transmit, to a base station apparatus, the second time-domain signal simultaneously with other communication terminal, in case that the other communication apparatus performs communication with the base station apparatus using one or more second block as an allocation unit wherein the second block composed of two or more contiguous subcarriers, wherein the number of subcarriers composing of the second block is integral multiplication of the number of subcarriers composing of the first block in which the integral multiplication is a multiplication of two or more integers.

6. A transmission method of a base station apparatus comprising:

allocating, to a first communication terminal, one or more first block composed of two or more contiguous subcarriers as an allocation unit and allocating, to a second communication terminal, one or more second block composed of two or more contiguous subcarriers as allocation unit, simultaneously;

transmitting, to the first communication terminal, first information indicating the one or more first block, and transmitting, to the second communication terminal, second information indicating the one or more second block; and receiving, from the first communication terminal, a Discrete Fourier Transform-spread-OFDM (DFT-S-OFDM) signal transmitted using the first information and receiving, from the second communication terminal, a Discrete Fourier Transform-spread-OFDM (DFT-S-OFDM) signal transmitted using the second information, wherein the number of subcarriers composing of the second block is integral multiplication of the number of subcarriers composing of the first block in which the integral multiplication is a multiplication of two or more integers.

* * * * *